United States Patent [19]

Todokoro

[11] 4,306,717
[45] Dec. 22, 1981

[54] GAME BOARD

[76] Inventor: Masatoshi Todokoro, 2-33 Koganehara 2-chome, Matsudo-City, Chiba, Japan, 270

[21] Appl. No.: 165,847

[22] Filed: Jul. 7, 1980

[30] Foreign Application Priority Data

Mar. 8, 1980 [JP]  Japan .............. 55/29994[U]

[51] Int. Cl.³ .............................................. A63F 9/00
[52] U.S. Cl. ........................ 273/1 GE; 273/1 GG; 403/316
[58] Field of Search ............ 273/1 GE, 1 GG, 1 GC, 273/1 G, 1 GD; 272/31 R; 403/349, 316

[56] References Cited

U.S. PATENT DOCUMENTS

| 650,184 | 5/1900 | Maddock | 403/349 X |
|---|---|---|---|
| 1,213,492 | 1/1917 | Hughes | 403/316 X |
| 2,341,431 | 2/1944 | Fairbanks | 403/349 X |
| 2,917,310 | 12/1959 | Durrell | 273/1 GE X |
| 3,395,920 | 8/1968 | Moe | 273/405 X |
| 3,649,009 | 3/1972 | Breslow | 273/1 GE |
| 3,853,414 | 12/1974 | Hirano et al. | 403/316 X |
| 4,133,560 | 1/1979 | Ishikawa et al. | 403/349 X |
| 4,149,725 | 4/1979 | Todokoro | 273/357 |
| 4,244,568 | 1/1981 | Ferris et al. | 273/1 GE |

FOREIGN PATENT DOCUMENTS

| 1117464 | 11/1961 | Fed. Rep. of Germany | 272/31 R |
|---|---|---|---|
| 1544391 | 4/1979 | United Kingdom | 273/1 GG |
| 2018143 | 10/1979 | United Kingdom | 273/1 GE |

Primary Examiner—Paul E. Shapiro
Attorney, Agent, or Firm—George B. Oujevolk

[57] ABSTRACT

A game board by which a game for catching dangling objects can be played. The players operate animated catcher bodies disposed on the base board so as to snap at the objects to be caught which hang down removably from a rotating roof above the base board. The game board comprises a roof from which a plurality of objects to be caught hang down removably, a base board, a post supporting said roof above the base board, a driving mechanism for rotating said roof, and a plural number of animated catcher bodies arranged on the base board.

8 Claims, 22 Drawing Figures

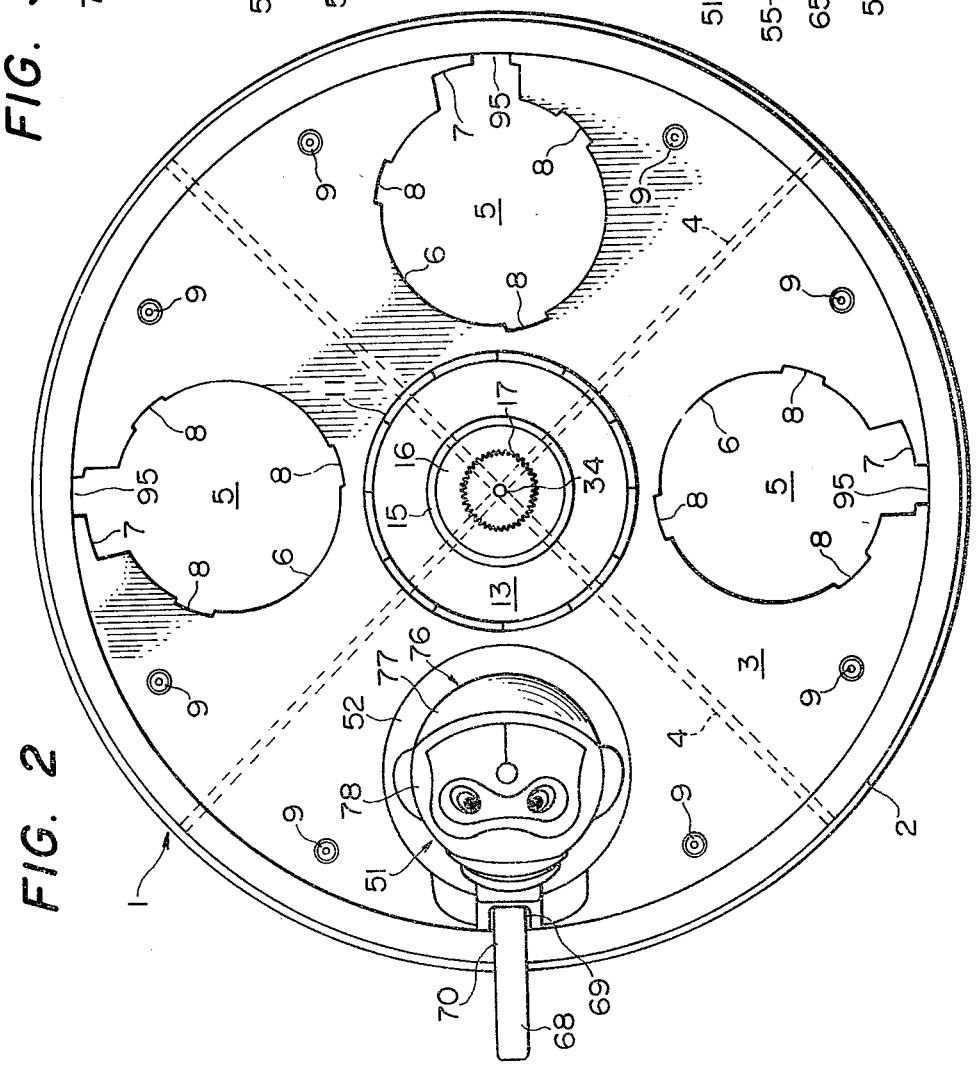

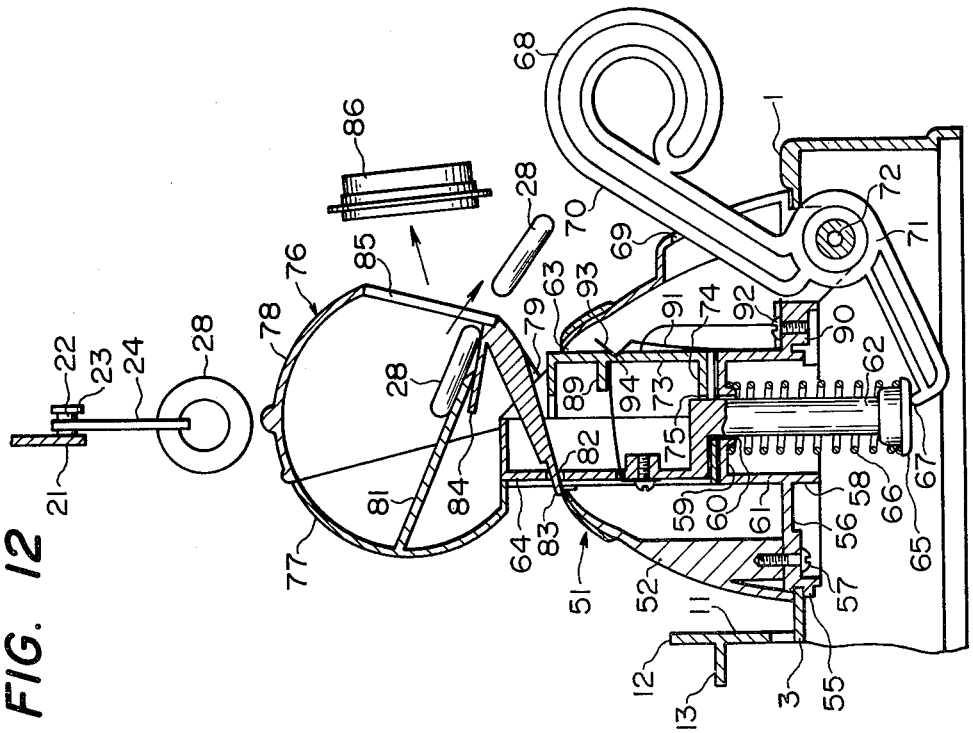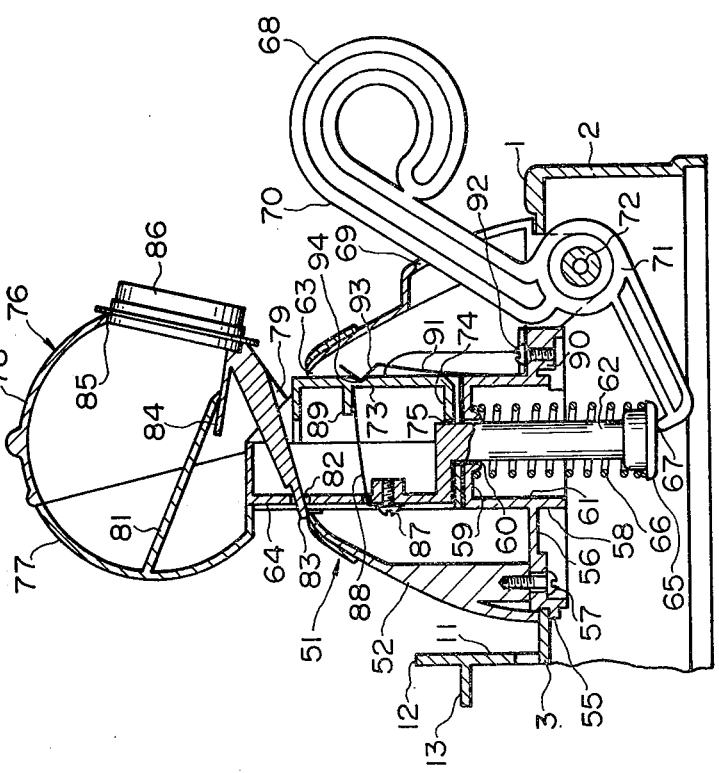

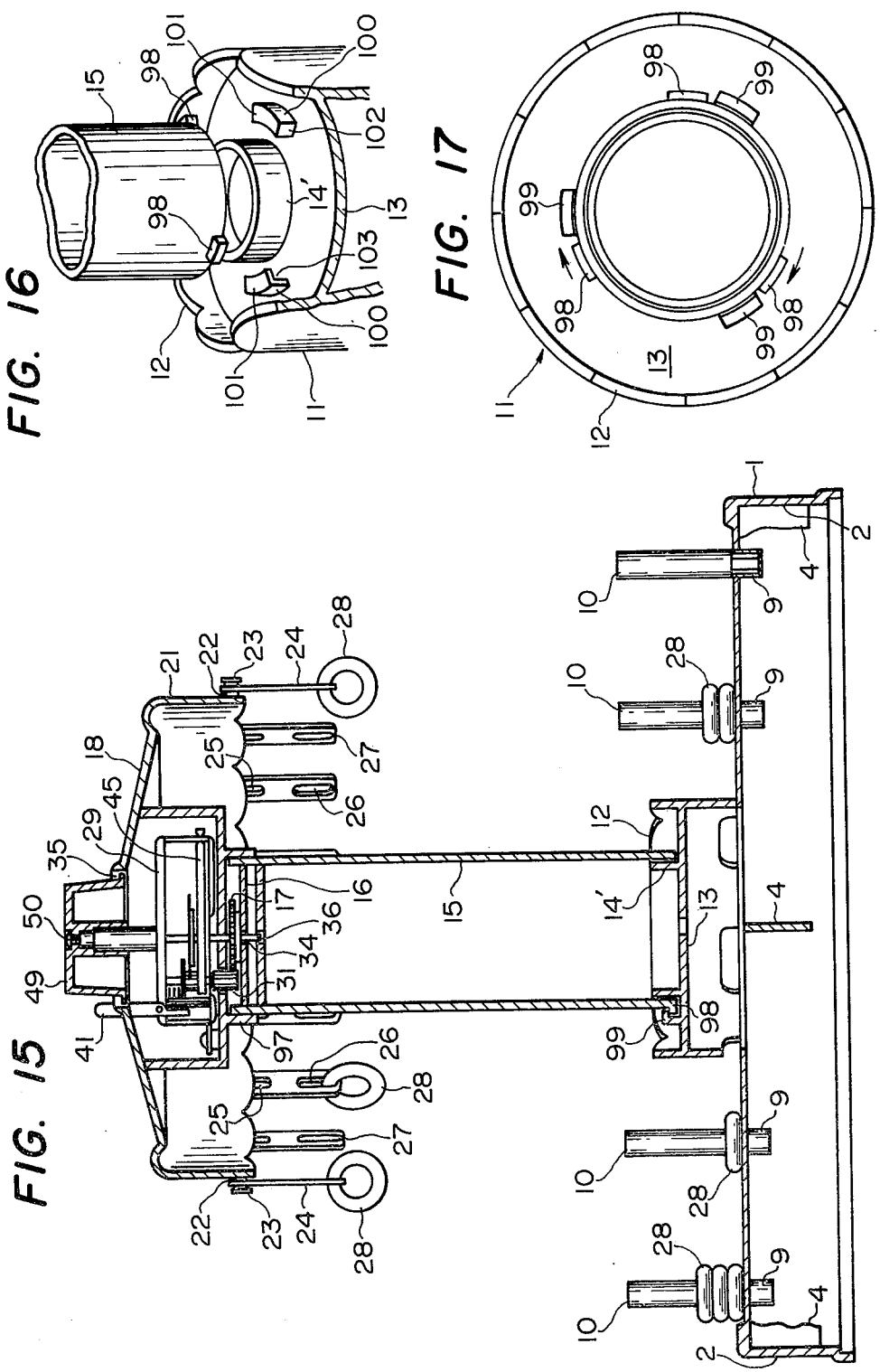

4,306,717

GAME BOARD

BACKGROUND OF THE INVENTION

The present invention relates to a game for catching objects, and more particularly to a game wherein objects are caught in the mouth of an animated catcher.

Generally speaking, the present invention contemplates a game board by which a game for catching dangling objects can be played. The players operate animated catcher bodies disposed on a base board so as to snap at the objects to be caught which hang down removably from a rotating roof above the base board. The game board comprises a roof from which a plurality of objects to be caught hang down removably, a base board, a post supporting said roof above the base board, a driving mechanism for rotating said roof, and a plurality of animated catcher bodies arranged on the base board.

OBJECTS OF THE INVENTION

Thus an object of this invention is to provide a game board for playing a game of capturing objects hanging down which are easily removable from a rotating roof by operating animated catcher bodies on the base board with levers so as to snap at the objects.

Another object of this invention is to provide a demountable game board of this type which, when used, can be easily assembled by combining four parts, that is, a roof, a base board, a central support post and animated catcher bodies, and after use, the game board can be easily disassembled into said four parts for easy packaging in a compact case.

Still another object of this invention is to provide a game board of this type using animated catcher bodies each of which consists of a hollow slit head portion assuming the shape of the head of an animal or otherwise configured and a trunk portion to which said split head portion is pivotally joined, said head portion being operated with a lever so as to snap at an object to be caught, said portion being also provided with an opening from which the objects captured in said portion can be taken out.

A further object of this invention is to provide a game board of the said type which has provided on its base board a set of poles for preserving or holding the ring-shaped or doughnut-shaped objects captured by the respective catchers arranged on the base board.

The invention as well as other objects and advantages thereof will be more apparent from the following detailed description when taken in conjunction with the accompanying drawings, in which:

BRIEF DESCRIPTION OF THE DRAWINGS

FIGS. 1 to 14 show an embodiment of this invention, in which

FIG. 1 is a side view of the device, with parts shown in section;

FIG. 2 is a plane view of the base board on which the support post and one animated catcher body are mounted;

FIG. 3 is a side elevation of an animated catcher body;

FIG. 4 is a bottom view thereof;

FIG. 5 is an enlarged bottom view of an animated catcher body as it is being mounted to the base board;

FIG. 6 is an enlarged bottom view of said body as it has been just set in position on the base board;

FIG. 7 is a bottom view, partly shown in section, of the rotary roof;

FIG. 8 is a bottom view of the rotary roof;

FIG. 9 is a plane view showing the meshed relation of the gears in the mechanism for rotating the roof;

FIG. 10 is a side view showing the mechanism in the frame;

FIG. 11 is an enlarged sectional view of an animated catcher body in a state where it is about to be operated;

FIG. 12 is an enlarged sectional view of said body in a state where its operation has been completed and the cover of the captured object take-out opening was removed;

FIG. 13 is an enlarged sectional view of the catcher body at a moment when its operation was just started;

FIG. 14 is an enlarged sectional view of the catcher body in a state where it has captured an object to be caught.

FIGS. 15 to 17 show a partially modified embodiment of this invention, in which

FIG. 15 is a side view thereof, with parts shown in section;

FIG. 16 is a partially cut-out perspective view of the post joint; and

FIG. 17 is a plane view of the post in a state where it is just about to be secured in position on the base board.

FIGS. 18 to 22 show another partially modified embodiment of this invention, in which FIG. 18 is a plane view of the base board on which the support post and one animated catch body have been mounted;

FIG. 19 a side view of an animated catcher body in this embodiment;

FIG. 20 is a bottom view thereof;

FIG. 21 is a back-side view thereof; and

FIG. 22 is view showing engagement of a protuberance on the catcher body.

DETAILED DESCRIPTION OF THE INVENTION

The device of this invention is now described in detail by way of an embodiment thereof with reference to FIGS. 1 to 14 of the accompanying drawings.

Figure 1:
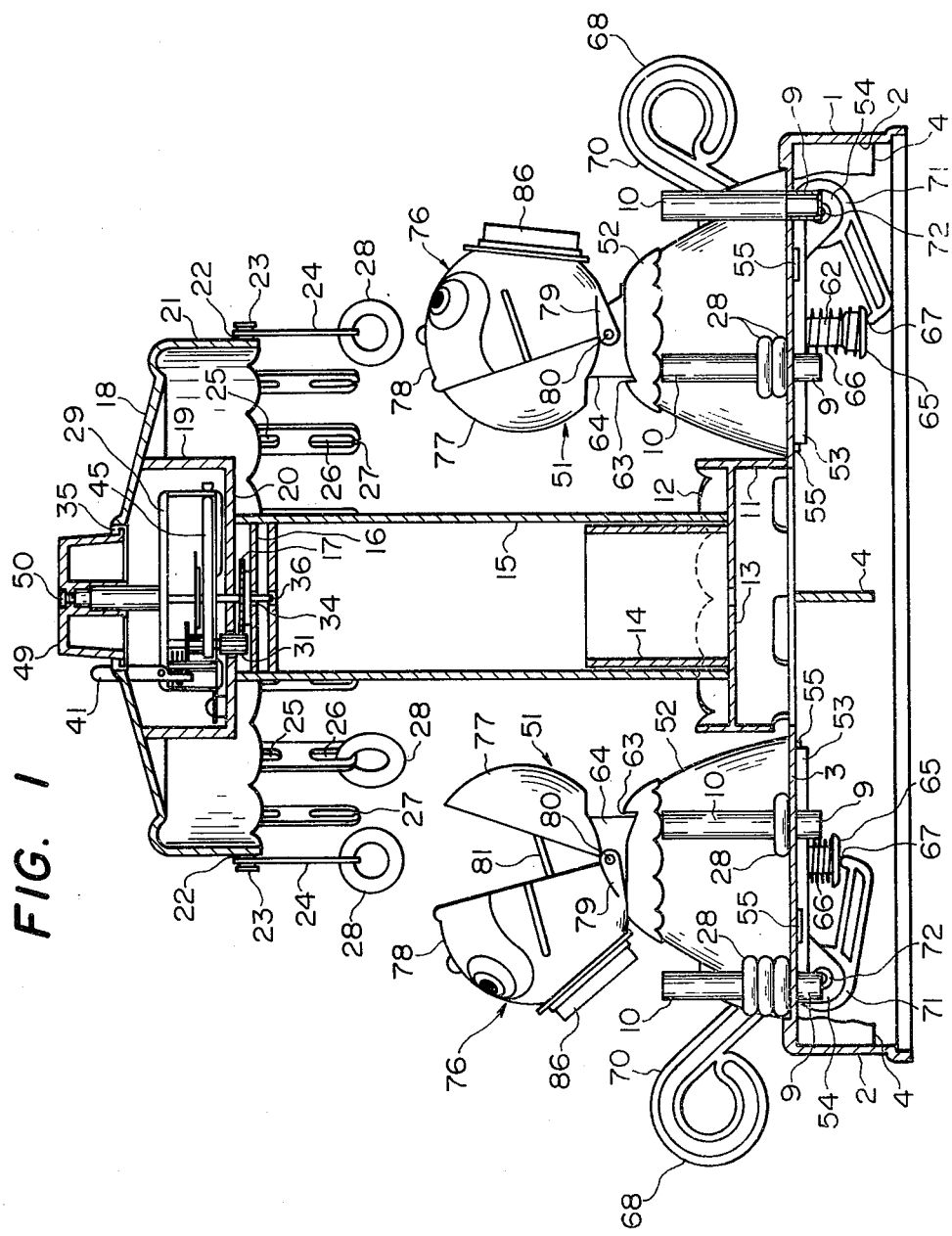

The device comprises a base board 1 surrounded by a circular wall 2 and having a flat surface 3, said surrounding wall 2 and board surface 3 being formed integral with each other. The bottom side of the base board 1 is open. Reinforcing ribs 4 are provided extending across the underside of the board 1 so that they cross at the center of the base board. Along the periphery of the board surface 3 are formed the equidistantly spaced-apart mounting holes 5 each of which consists of a circular edge 6, a dovetail recession 7 formed at the part of the edge 6 positioned remotest from the center of the board, and three shallow recessions 8 formed along the other part of the edge 6 than said dovetail recession 7. Provided on both sides of each said mounting hole 5 and close to the periphery of the board surface 3 are the small openings 9, 9 through each of which is removably fitted a pole 10. Provided centrally of the board surface is a cylindrical pedestal 11 of which the top edge is carved undulatively to form an ornamental edge 12 and which is provided with a flat horizontal circular supporting plate 13 at a level slightly lower than said ornamental edge 12, and a cylindrical post-supporting piece 14 is erected fixedly at the center of said supporting plate 13. 15 is a cylindrical center post of which the lower portion is removably fitted around said post-supporting piece 14. Said post has provided therein a horizontal support plate 16 at a position slightly lower than the top end of the post, and a fixed gear 17 is supported at the center of the upperside of said support plate 16 so that the center axis of said gear 17 is directed vertically. 18 denotes a rotary roof which has secured centrally to its inside a bottomed cylindrical member 19 of which the bottom plate 20 is secured to the top end of the post 15 so that the roof 18 is rotatable about the top end of the post 15. Said rotary roof 18 is provided with an ornamental wall 21 which extends down vertically from the peripheral edge of the roof 18, and the total 18 protuberances 22 are provided equidistantly from each other on the external surface of said ornamental wall 21, each of said protuberances 22 having at its end an integral flange 23. A hanging bar 24 suspends down from each said protuberance 22, said bar 24 being formed with two tandem elongated slots 25 and 26, the upper slot 25 being fitted on the protuberance 22 so that the bar 24 is movable vertically. The lower slot 26 has at its lower end an elastic slit 27 which can be forced open. A doughnut-shaped piece 28, or the object to be caught, is placed into the slot 26 of each hanging bar 24 by forcing the slit 27 open slightly, and after placing the doughnut-shaped piece 28 in said slot 26, the force given to the slit 27 is released to let it assume its original shape due to its elasticity, whereby the doughnut-shaped piece 28 is removably hitched to the hanging bar 24. Secured in the inside of the bottomed cylinder 19 is a frame 29 to which the following elements are secured: a shaft 32 supporting a planetary gear 31 projecting through a hole 30 in the bottom plate 20 and meshed with the fixed gear 17; a shaft 36 for winding a windup spring, said shaft 36 extending at its lower portion through a hole 33 at the center of the bottom plate 20 so that the lower end of said shaft loosely fits into a hole 34 formed at a middle part of the fixed gear 17, and also extending at its upper portion centrally through an opening 35 formed at the center of the rotary roof 18 so that the upper end of said shaft projects out from the roof 18; three shaft gears 37, 38 and 39; and a damping lever 41 pivoted at 40 and extending out from the roof 18. Said winding shaft 36 has loosely mounted thereon a gear 43 through a one-way clutch 42 and also has secured thereto the inner end of a windup spring 45 whose outer end 44' is fixed to the machine frame 29. Mounted on the shaft 32 are a pinion gear 44 meshed with said gear 43 and a gear 45' meshed with the shaft gear 37. Said shaft gear 37 is mounted with a gear 46 meshed with the shaft gear 38 which is mounted with a gear 47 meshed with the shaft gear 39, and said shaft gear 39 is adapted with a damping piece 48. Designated by numeral 49 is a grip mounted at the upper end of the spring winding shaft 39, said grip being fitted in the roof opening 35 and secured in position by a screw 50. Numeral 51 designates generally an animated catcher body having the following structure. It has a trunk portion 52 modeled after the trunk of an animal, for example the upper half part of the trunk of an ape, said trunk portion 52 having at its bottom a bottom plate 56 secured in position by screws 57, said bottom plate 56 having a cylindrical side wall 53 corresponding in diameter to the edge 6 of the mounting hole 5 in the base board 1, a pair of parallel lever supporting portions 54, 54 designed to fit into the dovetail recession 7 in said hole 5, and tongues 55 projecting from the side wall 53 so as to fit into the respective shallow recessions 8 in said hole 5. Said bottom plate 56 also has integrally provided centrally thereof a cylindrical side wall 58, a sole plate 59 covering the upper end thereof and having a hole in its center, and a pedestal 61 also having at its center a hole 60 aligned with that in said sole plate 59. A push-up rod 62 is vertically movably passed through said hole 60, with the top end of said push-up rod 62 being integrally joined to the bottom of a push-out member 64 which is U-shaped in section and passed through an opening 63 formed at the top of the trunk portion 52. Said push-up rod 62 is loaded with a spring 66 interposed between the flange 65 at the lower end of said rod 62 and the sole plate 59, whereby said both push-up rod 62 and push-out member 64 are always urged downwards as shown in FIG. 1. The lever supporting portions 54, 54 are pivoted by a pin 72 provided at a middle part of a lever 70 of which one end 67 abuts against the bottom of the push-up rod 62 and the other end 68 shaped like an ape tail projects out through an opening 69 formed in the backside of the trunk portion 52. Said push-out member 64 is provided with a slidable cylinder 73 having at its bottom plate 74 an opening 75 through which the upper end of the push-up rod 62 is inserted. The animated catcher body also has a head portion comprising a hollow structure 76 modeled after an upwardly facing ape head, said hollow structure 76 being split at its mouth-like part into the lower jaw side segment 77 and an upper jaw side segment 78. The lower jaw side segment 77 is integrally joined to the top end of the slide cylinder 73 while the upper jaw side segment 78 is provided at its lower part with a pair of parallel connecting bars 79, 79 which are pivoted by the respective pins 80, 80 extending from both sides of an upper portion of said slide cylinder 73, whereby the upper jaw side segment 78 can be opened and closed relative to the lower jaw side segment 77. Formed integrally in the lower jaw side segment 77 is a guide plate 81 which gradually slants down toward the rear head portion of the upper jaw side segment 78. The upper jaw side segment 78 is provided at its lower part with an operating bar 83 extending out from between the connecting bars 79, 79 to pass through an opening 82 formed at an upper part of the push-out member 64, a communication plate 84 extending out from the proximal end of said bar 83 toward the underside of the guide plate 81 to communicate therewith, a circular prize outlet opening 85 formed at the rear head portion, and a removable hat-shaped cover 86 of said opening 85. Provided across and substantially centrally of the push-out member 64 is a leaf spring 88 whose one end is fixed by a screw 87 and the other end is pressed against a protuberance 89 provided on the inner wall of the slide cylinder 73, whereby said slide cylinder 73 is always urged to bring the upper jaw side segment 78 to its closed position. There is also provided another leaf spring 91 whose lower end is secured by a screw 92 to a protuberant portion 90 at the base of the side wall 53, with the upper end of said leaf spring 91 being bent in V shape, the V-shaped bent portion 93 being designed to pressedly fit into a corresponding knotch 94 formed on the outer side at a middle part of the slide cylinder 73. During the first half of the ascending stroke of the push-out member 64, said bent portion 93 pressedly fits into said knotch 94 to hold the slide cylinder 73 at the position where the upper jaw side segment is opened, and during last half of the ascending stroke of said push-out member 64, said bent portion 93 slides in pressed contact along the external surface of the slide cylinder 73, and when said slide cylinder 73 ascends by a distance from said knotch 94 to the bottom plate 74, said bent portion 93 comes off the external surface of the slide cylinder 73 toward the bottom side to release its pressing force.

Figure 5:
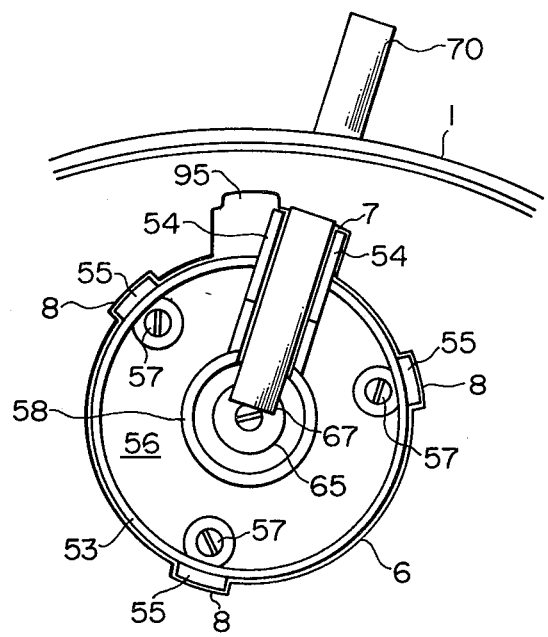
Figure 6:
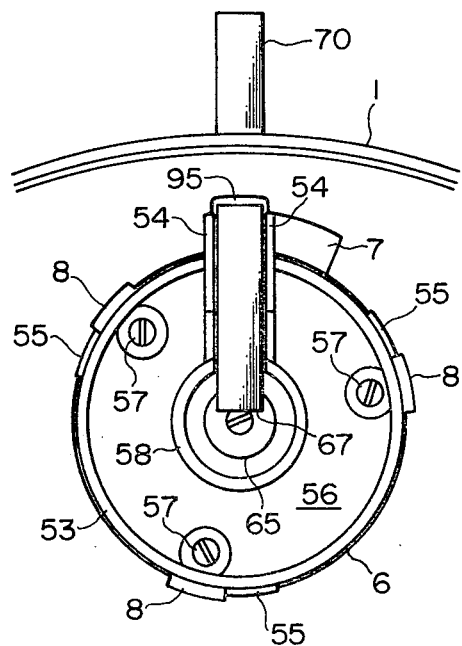
Figure 8:
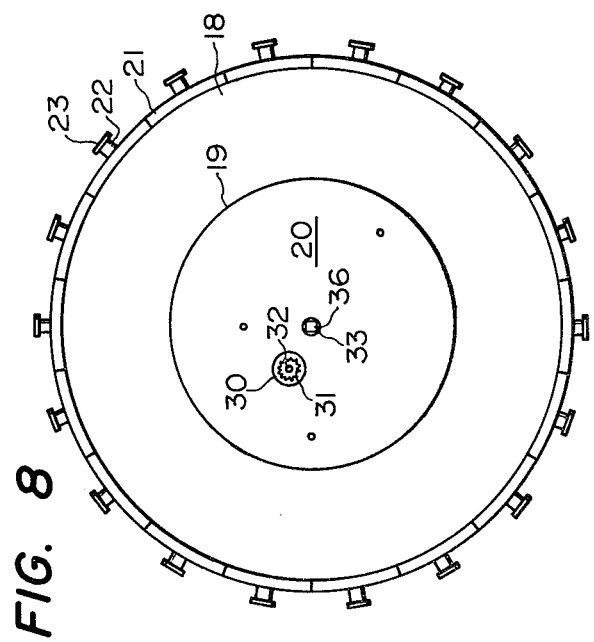
Figure 10:
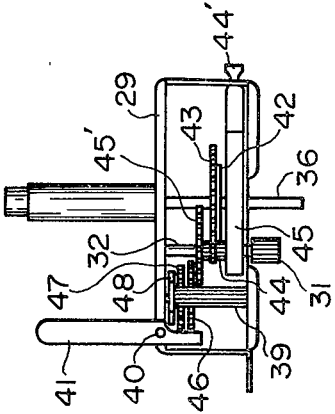
Figure 7:
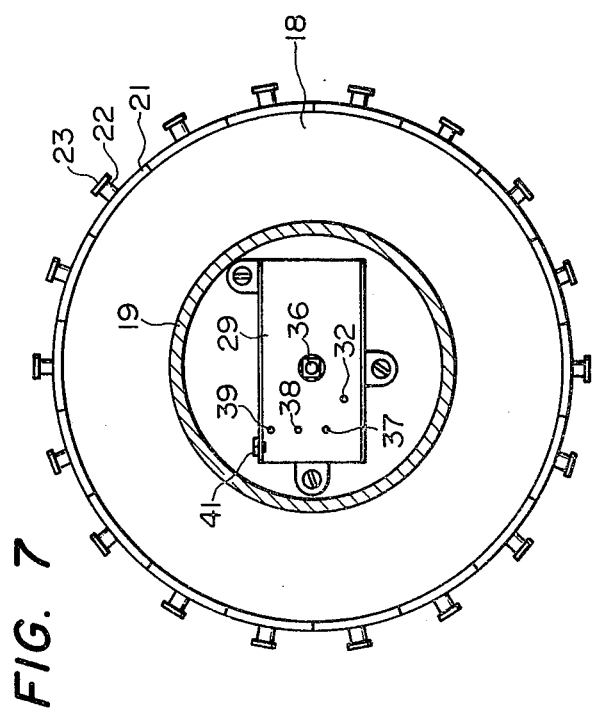
Figure 9:
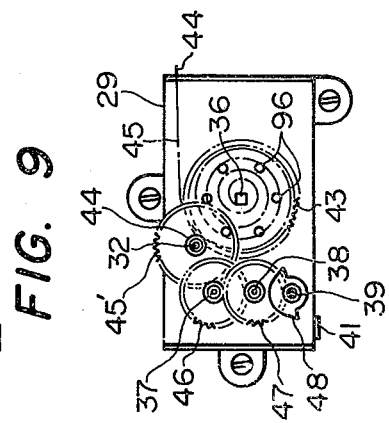

The game board of this invention having the above-described construction is operated as follows. First, the four animated catcher bodies 51 are set on the base board 1 in the following way. As illustrated in FIG. 5, the side wall 53 of the bottom plate 56 secured to the bottom of each animated catcher body 51 is fitted to the edge 6 of the hole 5 and the lever supporting portions 54, 54 are inserted into a portion of the dovetail recession 7 positioned sidewise of the correct position 95 while placing the tongues 65 in the respective recessions 8. Then, by turning the trunk portion 52, the lever supporting portions 54, 54 are moved to the correct position 95 while simultaneously moving the tongues 55 from the recessions 8 to the positions where they are engaged with the underside of the hole edge 6 as shown in FIG. 6. When each of the catcher bodies 51 was thus properly set on the board, the lower portion of the post 15 is fitted on the post-supporting piece 14 so that the post 15 is fixedly erected on the base board 1. Then the bottom plate 20 of the bottom cylinder 19 of the rotary roof 18 is set on the top end of the post 15 and the lower end of the spring winding shaft 36 is loosely inserted into the hole 34 in the fixed gear 17 so that the fixed gear 17 is meshed with the planetary gear 31, thereby supporting the roof 18 so that it is rotatable about the top end of the post 15. Then the poles 10 are inserted into the respective receiving holes 9 to thereby erect the poles 10 on the board. Assemblage of the game board is thus completed.

Then the grip 49 is turned in one direction, whereby the spring 45 is wound up while the one-way clutch 42 is turned without engaging with any of the holes 96 in the gear 43, thus keeping the gear 43 stationary.

When the spring 45 has been sufficiently wound up to accumulate the rotative power, the damping lever 41 is turned to the position where its lower end stays away from the damping piece 48, whereupon the rotative power is exerted to the shaft 36 owing to the unwinding action of the spring 45, causing the shaft 36 to turn contrariwise to the winding direction. Accordingly, the one-way clutch 42 is engaged with one of the holes 96 in the gear 43 to let it turn. This rotation of the gear 43 is reduced as it is transmitted through the pinion gear 44, gear 45, shaft gear 37, gear 46, shaft gear 38, gear 47 and shaft gear 39 in that order, and the reduced rotative power is conveyed through the shaft 32 to the planetary gear 31 to let it turn around the fixed gear 17 with which said planetary gear is meshed. This causes the roof 18 to turn accordingly.

Figure 13:
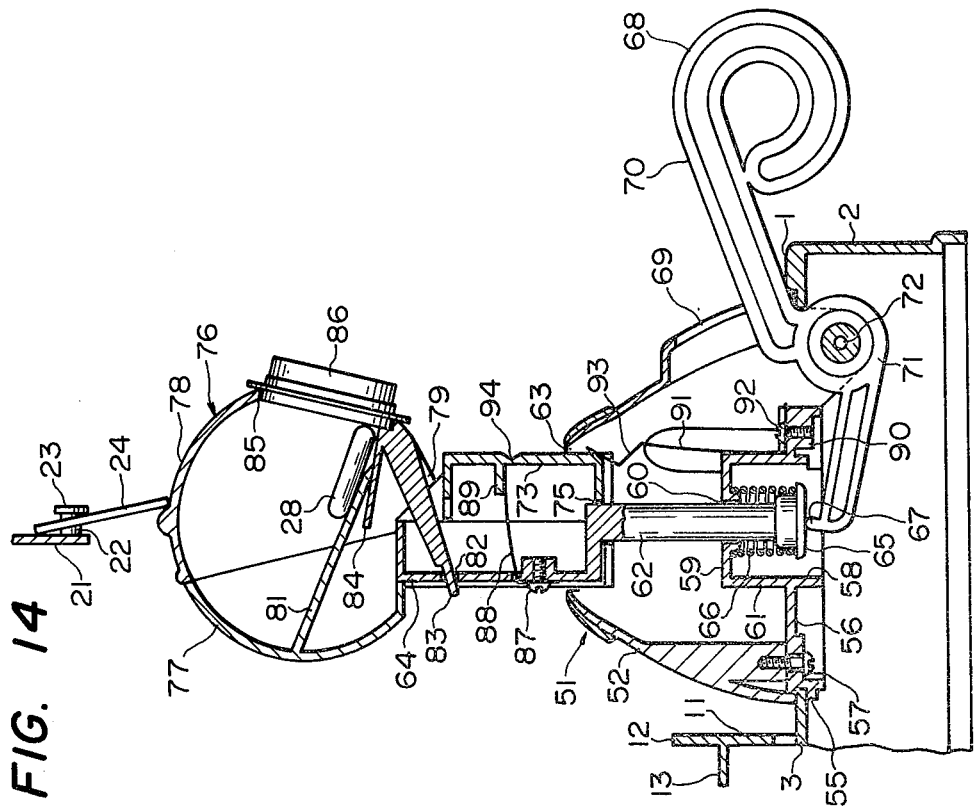
Figure 14:
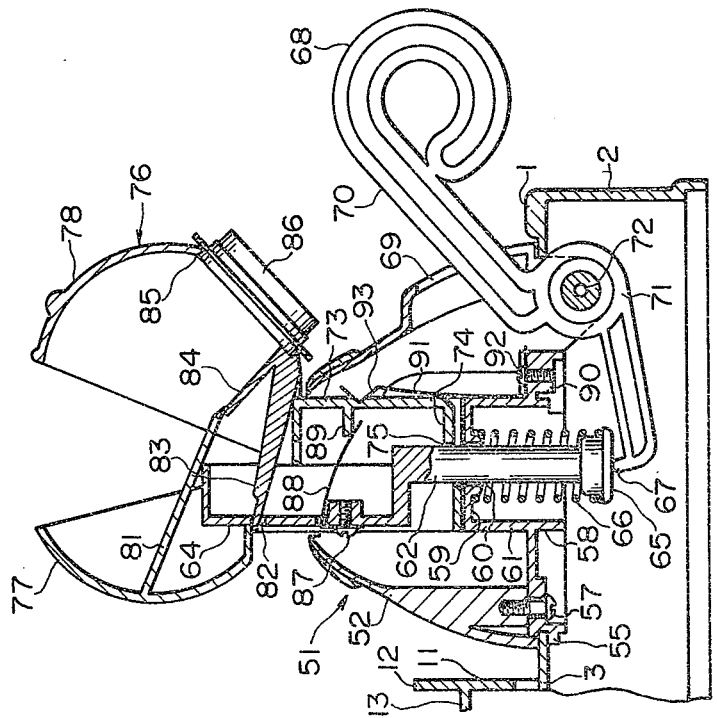
Figure 19:
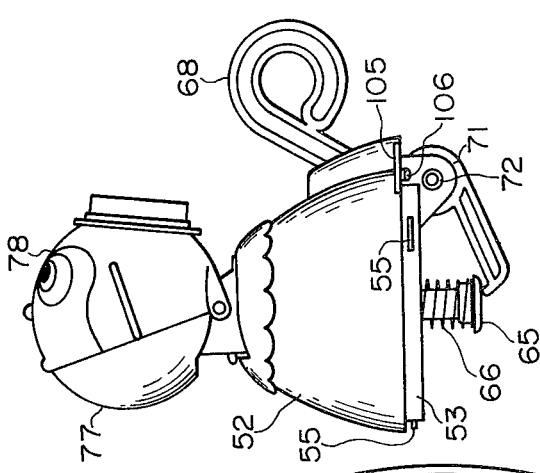
Figure 20:
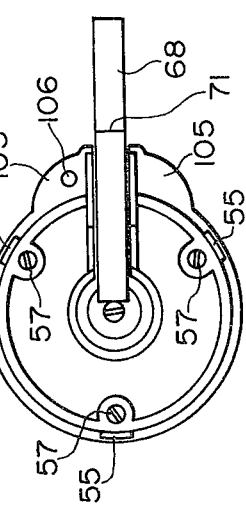
Figure 18:
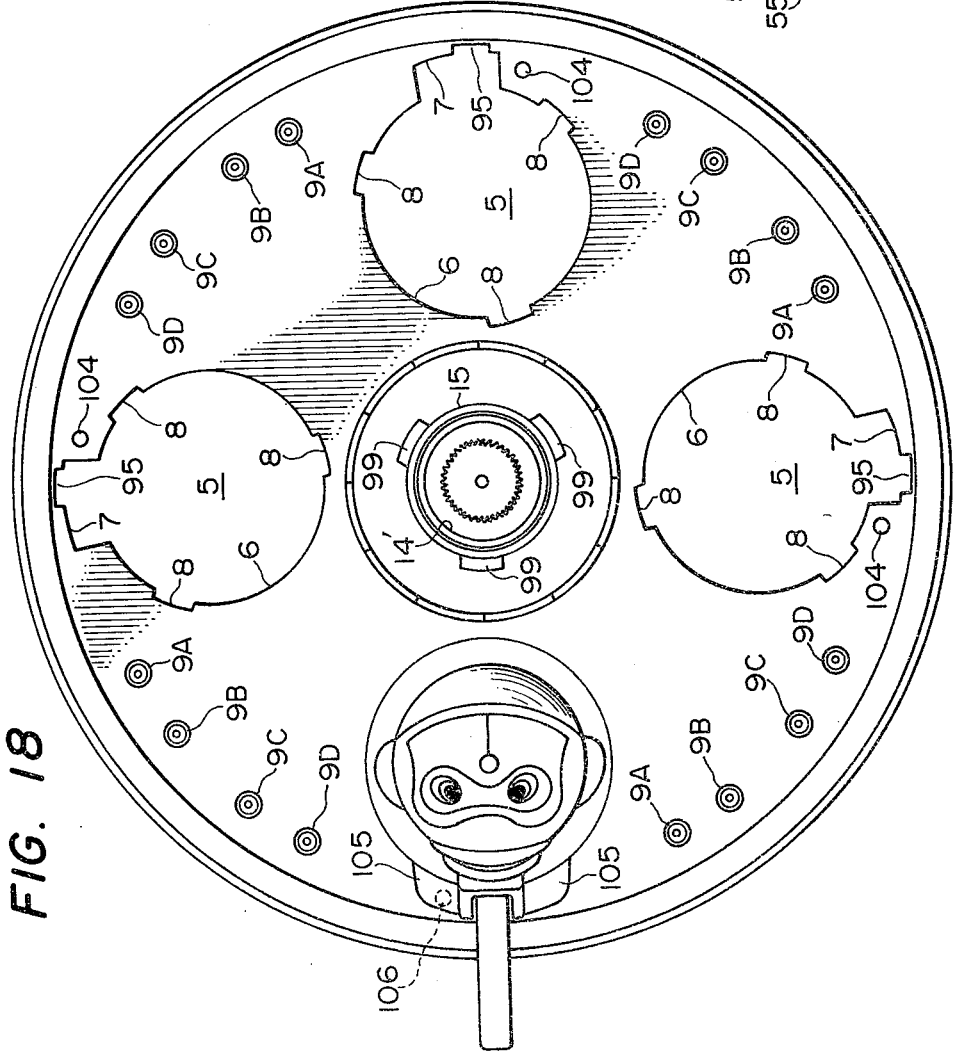
Figure 21:
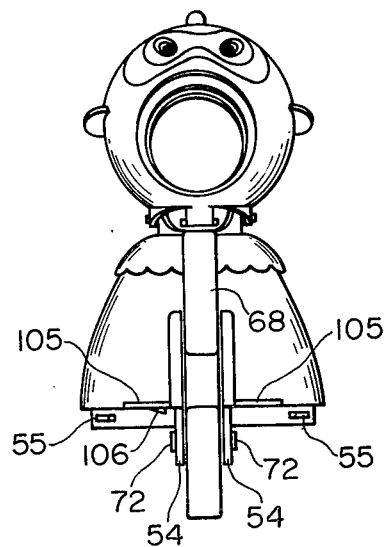
Figure 22:
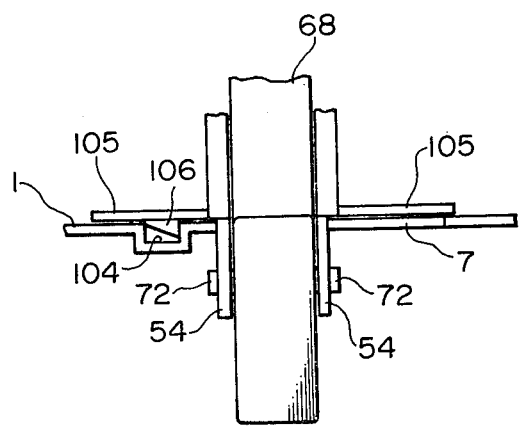

Under this condition, each player (four players in all in the shown embodiment) holds the end portion 68 of the lever 70 projecting out from the back side of his catcher body 52 and pushes it down. Whereupon the end 67 of the lever 70 abutting against the lower end of the push-up rod 62 pushes up said rod 62 against the pressing force of the spring 66, and hence the push-out member 64 joined to the upper end of said push-up rod 62 is accordingly pushed out vertically upwards from the trunk portion 52. In the first half of this pushed-out stroke of the push-out member 64, the slide cylinder 73 is locked by the bent portion 93 of the leaf spring 91 to stay in contact with the sole plate 59 and the end of the operating lever 83 is pushed up to turn the upper jaw side segment 78 about the pivotal pins 80, 80 as if the mouth was opened as shown in FIG. 13, and in the last half of the pushed-out stroke of said pushout member 64, the pressing force of the leaf spring 88 against the slide cylinder 73 overwhelms the holding force of the leaf spring 91 on the slide cylinder 73, allowing the slide cylinder 73 to rise up, whereby both the lower jaw side segment 77 and the upper jaw side segment 78 at its open position are raised up and also the proximal end of the operating lever 83 is pushed up to let the upper jaw side segment 78 turn to its closed position as shown in FIG. 14. In case an object to be caught 28 has reached the open space between the lower and upper jaw side segments 77 and 78 during said closing movement of the upper jaw side segment 78, said object is captured as if snapped and swallowed into the head portion 76, and in case no object has reached said space during said movement, no object is captured and the uncaptured object keeps turning round while hanging down from the bar 24.

When the pressing force on the end portion 68 of the lever 70 is released, the push-up rod 62 is forced down under the elastic action of the spring 66, causing the push-out member 64 and slide cylinder 73 to be also forced down into their positions in the trunk portion 52. Both head segments 77 and 78 also descend to the original position while closed relative to each other.

Said operation of each lever 70 is repeated to actuate the head portion of each animated catcher body 51 so as to snap at each moving object 28 by the split segments 77, 78. The four players do the same operation to vie for the prizes. The game is continued until the turning roof 18 comes to a stop with run-down of the windup spring 45 or the movement of the roof 18 is forced to stop by operating the damping lever 41 to the position where its lower end is engaged with the damping piece 48, and when the roof 18 has stopped, the cover 86 of the head portion of each animated catcher body 51 is removed to open the prize outlet 85, whereby the prizes or captured objects 28 automatically slide down on the slant guide plate 81 and communication plate 84 to drop out. The prizes 28 are stacked up round the erect pole 10 positioned close to the trunk portion 52 of each animated catcher body 51 as shown in FIG. 1, and the number of the prizes is counted and compared with those of the other players to decide the game.

The above-said operation is repeated to play as many games as desired, and when all games were completed, the roof 18 is removed from the top end of the post 15, the post 15 is pulled out from its supporting piece 14, the catcher bodies 51 are removed from the respective holes 5 and the poles 10 are pulled out from their insertion holes 9 to thereby complete disassemblage of the game board, and the separated parts are placed in a box.

Referring now to FIGS. 15 to 17 of the accompanying drawings, there is shown a partially modified embodiment of this invention. In this embodiment, a guide cylinder 97 is provided integral with the bottom cylinder 19 provided centrally on the inside of the roof 18, said guide cylinder 97 projecting down centrally from the underside of the bottom plate 20 of said cylinder 19 and adapted to rotatably fit around the upper portion of the post 15 to facilitate correct positioning of the roof 18 on the post 15. Along the periphery of the lower end of the post 15 are provided three tongues 98 spaced-apart equidistantly from each other and designed to engage with the corresponding protuberant pieces 99 provided on the upperside of the sole plate 13 of the pedestal 11 disposed centrally on the base board 1. These engaging pieces 99 are provided at the three equidistantly spaced-apart positions around the lower end of the post-supporting portion 14' having a substantially same height as the top edge of the pedestal 11, and each of said engaging pieces 99 is composed of a side wall 100 erected from the surface of the sole plate 13, a top wall 101 extending horizontally from the upper end of said side wall 100 toward the post-supporting portion 14', an end wall 102 closing an end of the engaging space defined by said side wall 100 and top wall 101, and an inlet opening 103 formed at the other end of said space.

In assemblage, first the lower end of the post 15 is fitted round its supporting member 14' such that the tongues 98 are uncoincidental with the respective engaging pieces 99 as shown in FIG. 17 and then the post 15 is turned in the direction of arrows to bring the tongues 98 into engagement with the corresponding engaging pieces 99 to thereby secure the post 15 stably in position.

Another partial modification according to this invention is shown in FIGS. 18 to 22. In this embodiment, a line of holes 9A, 9B, 9C and 9D are provided in the board surface between every adjoining mounting holes 5; and the poles (not shown) colored in different colors such as pink, yellow, green and blue are detachably set into said four holes 9A, 9B, 9C and 9D arranged on one side of each animated catcher body 51 or the holes 9A, 9B and 9D, 9C arranged on both sides of each said catcher body 51. The objects to be caught 28 are also colored in said four colors, and the captured objects 28 of a color are placed round the pole of the same color for each catcher body 51 so that the number of the prizes can be known by color. There are also provided a dent 104 at a position close to the dovetail recession 7 of each mounting hole 5 and a pair of basal plates 105, 105 extending horizontally from the bottom of the back side portion of each animated catcher body 51. On the underside of one of said basal plates 105 is provided a protuberance 106 whose end is cut aslant. According to this embodiment, when the trunk portion 52 is turned to move the tongues 55 from the respective recessions 8 to the position where they are engaged with the underside of the hole edge 6 for fitting each animated catcher body 51 to its mounting hole 5, said protuberance 106 slides on the surface of the base board 1 and fits into the dent 104. This locks the trunk portion 52 against turn in the reverse direction, thus securing each animated catcher body 51 to the base board 1 to inhibit casual dislocation thereof.

The device of this invention includes other changes and modifications within its scope such as, for example, a suitable change of the shape and number of the animated catcher bodies, use of an electric motor for prime mover, connection of the cover 86 to the trunk portion 52 by a string or other means to prevent its loss, etc.

Being designed and constructed as described above, the device of this invention allows playing a joyful game of vying for the prizes with comical movements of the animated catcher bodies each of which is actuated by operating a lever so as to snap at the object hanging down from the turning roof. The captured objects or prizes in each catcher can be easily taken out by removing the cover as they automatically slide down from the catcher upon removal of the cover, or they may be easily taken out with fingers. The user can also have amusement in assembling and disassembling the game board. After use, the game board can be easily taken down to pieces and placed compactly in a box, so that there is no problem of bulkiness or breakage of the game board as often experienced when it is housed in a box in the assembled form.

What is claimed is:

1. A game board for a game using a base board (1), a roof (18) from which a plurality of objects (28) to be caught hang down and are easily removed, a post for supporting said roof, and animated catcher bodies (51) arranged on the base board and operated by a lever (70) so as to snap at said object to be caught, said game board comprising: a base board (1) provided with a suitable number of mounting holes (5) disposed suitably spaced-apart from each other along the periphery of the board surface and also provided with a post-supporting portion at the center of the board surface, a post (15) having at its lower end a joining portion for removably joining it to said post-supporting portion and having mounted at its top end a fixed gear (17) so arranged that its center axis is directed vertically, a roof carrying along its periphery a suitable number of objects (28) to be caught which are arranged suitably spaced-apart from each other and hang down and are easily removed, said roof (18) also having secured to its central part a frame supporting a planetary gear (31) meshed with said fixed gear (17) and a prime mover for giving rotative power to said planetary gear (31), a suitable number of animated catcher bodies (51) each of which has a trunk portion (52) modeled after the trunk of an animal, said trunk portion having at its bottom a joining portion (54) for removably joining said trunk portion to said mounting hole (5), said trunk portion (52) having provided therein a push-out member (64) arranged so as to be movable vertically, a spring (66) acting to always urge said push-out member downwardly, and a lever (70) operated to push out said push-out member (64), said push-out member being adapted with a slide cylinder (73) to which is secured one of two split segments (77, 78) of a hollow structure (76) modeled after the head portion of an animal, the other segments being movable and arranged to open and close relative to said one segment and provided with an operating bar (83) joined to said push-out member, a first leaf spring (88) disposed between said push-out member and slide cylinder and adapted to press said slide cylinder to always urge said openable and closable movable segment to its closed position, and a second leaf spring (91) adapted to press against said slide cylinder during ascent of said push-out member and come off said slide cylinder when said slide cylinder has been pushed up a predetermined distance together with said push-out member and, an opening (85) provided at a part of said movable segment of the head portion for taking out the captured objects and a cover (86) removably set on said opening.

2. The game board according to claim 1, wherein a guide plate is provided in the split head portion for guiding the captured objects therein toward the outlet opening.

3. The game board according to claim 1, wherein poles are erected on the base board surface for laying thereround the prizes captured by the respective catcher bodies.

4. The game board according to claim 1, wherein the post is formed from a cylindrical body and a guide is provided at the central part on the inside of the roof, said guide being rotatably fitted to the top end of the post.

5. The game board according to claim 1, wherein the post is formed from a cylindrical body and provided with the tongues at the periphery of its lower end, said tongues being engageable with the corresponding protuberances provided on the pedestal of said post.

6. The game board according to claim 1, wherein a plural number of holes are provided adjacent to each animated catcher body so that the poles colored in different colors are inserted into said respective holes, and a plurality of objects to be caught are also colored in said different colors.

7. The game board according to claim 1, wherein recessions are provided along the edge of each said mounting hole and a cylindrical side wall corresponding in diameter to said edge of each mounting hole is provided at the bottom of the trunk portion of each animated catcher body, said side wall being provided with tongues which, in assemblage, are first placed in said respective recessions and then brought in engagement with the underside of the edge of said mounting hole.

8. The game board according to claim 1, wherein a dent opening to the board surface is provided close to each said mounting hole and a protuberance is provided at the bottom of each animated catcher body, said protuberance having its end cut aslant and designed to fit into said dent.

* * * * *